(12) United States Patent
Zhu et al.

(10) Patent No.: US 7,720,440 B2
(45) Date of Patent: May 18, 2010

(54) DISTRIBUTED COORDINATION OF A CLEAR CHANNEL ASSESSMENT (CCA) THRESHOLD

(75) Inventors: Jing Zhu, Hillsboro, OR (US); Hsin-Yuo Liu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 11/436,334

(22) Filed: May 18, 2006

(65) Prior Publication Data

US 2007/0270102 A1  Nov. 22, 2007

(51) Int. Cl.
*H04B 1/00* (2006.01)
*H04B 15/00* (2006.01)

(52) U.S. Cl. .............. 455/63.1; 455/67.11; 455/67.13; 455/522; 370/328; 370/338; 370/455

(58) Field of Classification Search ............... 455/63.1, 455/67.11, 67.13, 91, 522, 115.1; 370/328, 370/338, 455, 333
See application file for complete search history.

(56) References Cited

U.S. PATENT DOCUMENTS

| 2001/0028639 | A1* | 10/2001 | Eikelenboom et al. | 370/338 |
| 2002/0018008 | A1* | 2/2002 | Wright et al. | 340/945 |
| 2007/0060155 | A1* | 3/2007 | Kahana et al. | 455/450 |
| 2007/0072638 | A1* | 3/2007 | Yang et al. | 455/522 |

\* cited by examiner

*Primary Examiner*—Tuan A Pham
(74) *Attorney, Agent, or Firm*—Lee & Hayes, PLLC; Jason F. Lindh

(57) ABSTRACT

Embodiments of distributed coordination of a clear channel assessment threshold are presented herein.

20 Claims, 4 Drawing Sheets

, 102(N). The wireless nodes 102(1)-102(N) may be configured in a variety of ways to employ wireless communication techniques. For example, one or more of the wireless nodes may be configured as a computing device, such as a traditional desktop computer (e.g., wireless node 102(N) illustrated as a desktop PC), a server, a notebook computer (e.g., wireless node 102(1) illustrated as a laptop computer), a personal information appliance, and so on.

DISTRIBUTED COORDINATION OF A CLEAR CHANNEL ASSESSMENT (CCA) THRESHOLD

BACKGROUND

The prevalence of wireless communication is ever increasing. For example, users may use a wireless local area network (WLAN) to communicate using a wide range of devices, such as desktop personal computers, laptop computers, personal digital assistants (PDAs), wireless phones, wireless routers, wireless access points (WAPs), and so on.

Additionally, the range of locations, in which, users may employ these devices is also ever increasing. For example, a user may set-up a wireless access point in his apartment to obtain wireless access to the Internet. In another example, a corporation may provide devices (e.g., wireless routers and computers) that incorporate wireless techniques such that employees of the corporation may communicate, one with another, using the devices. In further examples, hotels, airports, coffee shops, and so on may also provide wireless access to the Internet to users for a fee.

However, because such a large and diverse range of wireless devices may be used in a wide range of locations, interference may be encountered which adversely affects the ability to communicate using wireless techniques at the locations. For example, a collection of closely-grouped wireless devices may "crowd" wireless networks which are used by the devices, which may thereby limit each device's ability to communicate as desired.

BRIEF DESCRIPTION OF THE DRAWINGS

The same reference numbers are utilized in instances in the discussion to reference like structures and components.

DETAILED DESCRIPTION

In the following discussion, an exemplary environment and devices are described which may provide and/or utilize distributed coordination of a clear channel assessment (CCA) threshold techniques. Exemplary procedures are then described which may be employed by the exemplary environment and/or devices, as well as by other environments and/or devices without departing from the spirit and scope thereof.

Exemplary Devices

Figure 1:
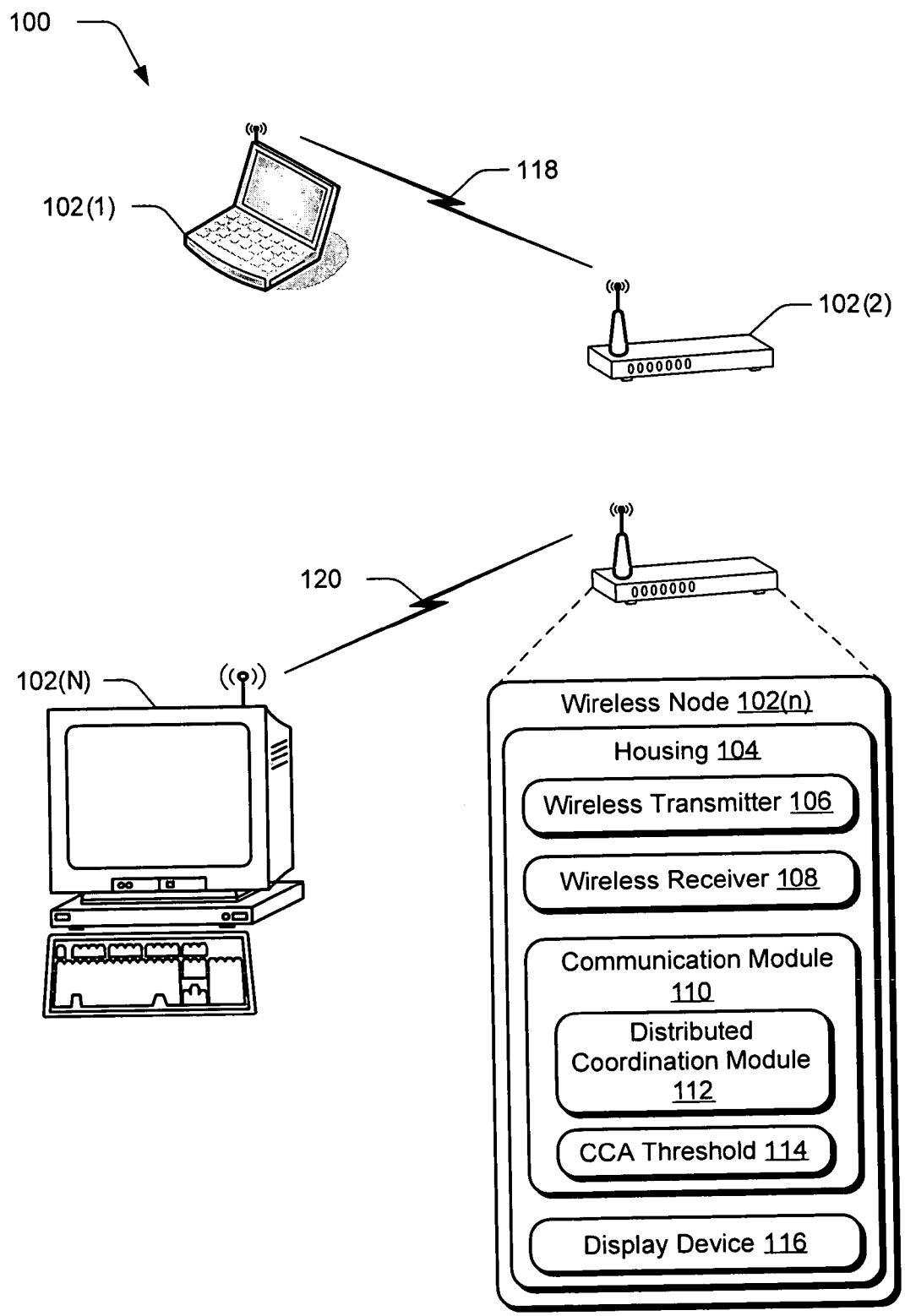
FIG. 1 is an illustration of an exemplary implementation of an environment that is operable to employ distributed coordination of clear channel assessment threshold techniques.

FIG. 1 illustrates an exemplary implementation of an environment 100 that is operable to employ techniques for distributed coordination of a clear channel assessment (CCA) threshold. The environment 100, as illustrated, includes a plurality of wireless nodes 102(1), 102(2), 102(n), . . . , 102(N). The wireless nodes 102(1)-102(N) may be configured in a variety of ways to employ wireless communication techniques. For example, one or more of the wireless nodes may be configured as a computing device, such as a traditional desktop computer (e.g., wireless node 102(N) illustrated as a desktop PC), a server, a notebook computer (e.g., wireless node 102(1) illustrated as a laptop computer), a personal information appliance, and so on.

Wireless nodes 102(1)-102(N) may also be configured to form an "infrastructure" of a wireless network, such as a wireless router, wireless access point (WAP), base station, and so on. Thus, the wireless nodes 102(1)-102(N) may be configured as a "thick" device having significant processing and memory resources (e.g., the illustrated laptop and desktop PC) to a "thin" device having relatively limited processing and/or memory resources that are dedicated to a particular function, such as a wireless router. A wide variety of other configurations are also contemplated.

Wireless node 102(n), for instance, as illustrated includes a housing 104 that contains a wireless transmitter 106, a wireless receiver 108, a communication module 110 having a distributed coordination module 112 and a clear channel assessment (CCA) threshold 114, and a display device 116. The wireless transmitter and receiver 106, 108 are configured to send and receive data through wireless communication using a variety of wireless communication standards. The display device 116 is configured to display data relating to wireless communication, such as status lights of the illustrated wireless station, the illustrated monitors of the desktop PC and the laptop, and so on.

The distributed coordination module 112 is representative of functionality that may be employed by the wireless nodes (e.g., wireless node 102(n)) to coordinate their respective CCA thresholds, e.g., CCA threshold 114 of wireless node 102(n), further discussion of which may be found below. Generally, any of the functions described herein can be implemented using firmware, hardware (e.g., fixed logic circuitry), software, manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices, such as through random access memory and/or a hard drive of the illustrated laptop and desktop PC. The features of the techniques to provide distributed coordination of a CCA threshold described below are platform-independent, meaning that the techniques may be implemented on a variety of commercial computing platforms having a variety of processors.

The environment 100 is representative of a variety of different wireless environments. For example, the environment 100 may represent a high density (HD) network having overlapping wireless nodes (e.g., base station systems (BSS) and so on), in which, combined network capacity is limited due to co-channel interference and adjacent channel saturation. For instance, transmissions performed by the wireless nodes 102(1)-102(N) may interfere with each other such that wireless communication performed by one of the wireless nodes has an adverse effect on wireless communication performed by other wireless nodes.

One technique that may be used to avoid interference is referred to as "Clear Channel Assessment". Clear channel assessment may be used by the respective wireless node to determine whether a wireless communication channel is "occupied", e.g., "busy" with another wireless communication and/or has an amount of interference that make the wireless communication channel unsuitable for communication. For example, the wireless communication channel may be occupied through use by another wireless node. The wireless communication channel may also be "occupied" by co-channel interference, adjacent channel saturation, and so forth. In this way, the amount of incoming energy detected may be used to determine whether the wireless communication channel is "available" or "not available" for communication, e.g., "occupied" or "not occupied".

The communication module 110 may use the CCA threshold 114 to specify the minimum amount of incoming energy for the wireless communication channel to be considered as not available for communication. By comparing an amount of detected incoming energy with the CCA threshold 114, for instance, the communication module 110 may determine availability of the wireless communication channel for communications to be transmitted by the wireless node 102(n) using the wireless transmitter 106. Thus, setting of the CCA thresholds by each of the wireless nodes 102(1)-102(N) may determine how communication is performed in the environment 100 by how "aggressive" or "passive" the CCA thresholds of the wireless nodes are set.

For example, the environment of FIG. 1 is illustrated as having two active transmissions. A first transmission 118 is transmitted from wireless node 102(1) to wireless node 102(2) and a second transmission 120 is transmitted from wireless node 102(N) to 102(n). The following table includes exemplary received signal strength for this example, in which, wireless nodes 102(1), 102(N) are both transmitting.

| Transmission/ Reception | Wireless Node 102(1) | Wireless Node 102(N) | Wireless Node 102(2) | Wireless Node 102(n) |
|---|---|---|---|---|
| Wireless Node 102(1) | — | −70 dBm | −60 dBm | −80 dBm |
| Wireless Node 102(N) | −70 dBm | — | −65 dBm | −60 dBm |
| Signal to Interference Ratio | — | — | 5 dB | 20 dB |

Assuming for this example that a minimum signal to interference ratio for successful reception is 15 dB for both transmissions 118, 120, and that the CCA threshold for both wireless nodes 102(1), 102(N) is set such that the transmitting nodes (i.e., wireless nodes 102(1), 102(N)) cannot "sense" each other (e.g., to −65 dBm). Therefore, the transmission 118 from wireless node 102(1) to wireless nodes 102(2) will fail and the transmission 120 from wireless node 102(N) to wireless node 102(n) will succeed in this example.

One technique that may be utilized to improve likelihood of successful communication is to employ "stand-alone tuning", such that each wireless node 102(1)-102(N) adapts its own CCA threshold without coordination. For example, the communication module 110 may employ a heuristic approach to stand-alone tuning to guide adaptation of the CCA threshold. As link reliability decreases, for instance, a transmitting node may reduce its CCA threshold to enlarge a sensing range for better protection by determining whether another wireless node is currently transmitting.

Continuing with the previous example, wireless node 102(1) that originates the transmission 118 may perceive more collisions and therefore reduce its own CCA threshold (e.g., to −75 dBm) to enlarge its sensing range such that wireless node 102(1) can sense the transmission 120 of wireless node 102(N). Thus, wireless node 102(1) may detect when wireless node 102(N) is transmitting and therefore avoid transmitting at that time and avoid the resultant collision that would be caused by the transmission. However, because wireless node 102(N) may successfully transmit, it will not adjust its CCA threshold and as a result, when wireless node 102(1) is transmitting, wireless node 102(N) may also transmit, again resulting in a collision at wireless node 102(1).

Therefore, the communication module 110 of wireless node 102(n) may also employ a distributed coordination module 112 to coordinate the CCA threshold 114 with CCA thresholds of other wireless nodes, e.g., nodes 102(1), 102(2), 102(N). For example, the wireless node 102(n) may employ the communication module 110 to broadcast the CCA threshold 114 to the other wireless nodes 102(1), 102(2), 102(N) in the environment 100. Likewise, the wireless node 102(n) may receive the CCA thresholds of the other wireless nodes 102(1), 102(2), 102(N) via the wireless receiver 108. In this way, the CCA thresholds may be shared throughout the environment 100, and consequently, the wireless nodes 102(1)-102(N) are made "aware" of the other CCA thresholds. The wireless nodes 102(1)-102(N) may then use this awareness to coordinate the CCA thresholds such that there is optimal spatial reuse in the environment 100. Further discussion of distributed coordination of CCA thresholds may be found in relation to FIGS. 3-4.

Figure 2:
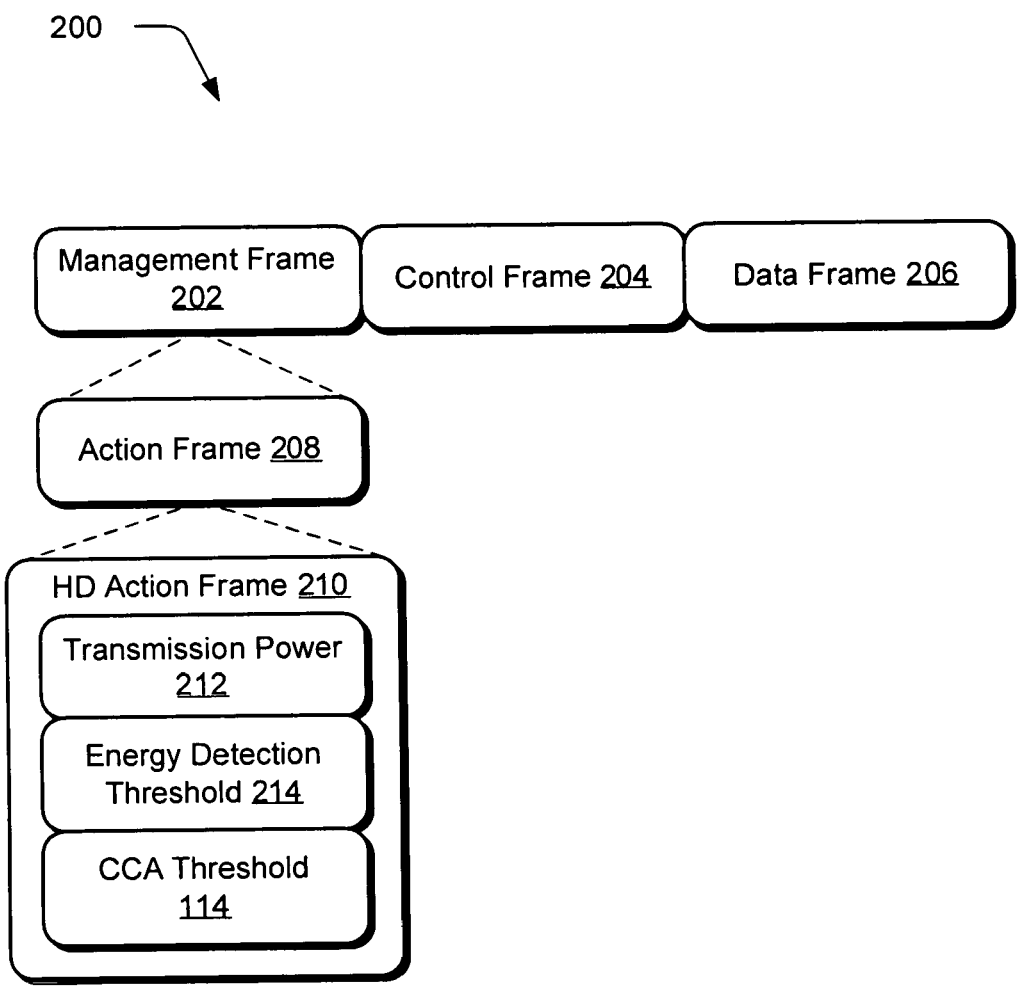
FIG. 2 is an illustration of an exemplary implementation of a frame format that is to communicate the clear channel assessment threshold of FIG. 1 between wireless nodes in the environment of FIG. 1.

FIG. 2 depicts an exemplary implementation of a frame format 200 that is configured to communicate the CCA threshold 114 between wireless nodes in the environment of FIG. 1. A variety of frame formats may be utilized to communicate the CCA threshold 114 between wireless nodes. For example, wireless local area network (WLAN) standards developed by working group 11 of the Institute of Electrical and Electronics Engineers (IEEE) Local Area Network/Multiaccess Network (LAN/MAN) Standards Committee (i.e., IEEE 802.11), which are commonly referred to collectively as "IEEE 802.11x", may be employed.

The IEEE 802.11x standards specify a frame format 200 for wireless communication that includes a management frame 202, a control frame 204 and a data frame 206. The management frame 202 is responsible for communication between wireless nodes, such as through communication of vendor specific information through use of an action frame 208. Traditional standards, however, did not provide a mechanism to provide over-the-air communications directly between wireless local area network clients, or any two wireless local area network devices that are in different cells.

Accordingly, a high-density (HD) action frame 210 may be included within the action frame 208 to provide such communication. For example, the HD action frame 210 may be thought of as a subclass of the action frame 208 allowing wireless nodes to be informed as to each other's CCA threshold to protect against space domain contention, as opposed to a time domain contention. For example, a "category" of the HD action frame may be defined as "25", which is currently reserved for future usage by IEEE Standard 802.11h. In an implementation, the HD action frame 210 is for broadcast and therefore the address one of the HD action frame 210 is set to "0xFFFFFF". A variety of other examples are also contemplated.

The HD action frame 210, for instance, may carry information elements for HD media access control (MAC) parameters, such as transmission power 212, energy detection threshold 214 and the CCA threshold 114. Additionally, frame size may vary with a number of HD information elements included within the frame. In an implementation, a size of the HD information element value is pre-defined and is different from each HD information element type.

Although the present discussion describes the CCA threshold 114 field (which may have a HD information element value of a 32 bit integer), a variety of other HD information elements having corresponding lengths are also contemplated for use in the frame 200, examples of which may be found in relation to the following table.

| Information Element (IE) | HD Information Element Type | HD Information Element Length (Bytes) |
|---|---|---|
| Broadcast Interval | 0 | 4 |
| Transmission Power 212 | 1 | 4 |
| Energy Detection Threshold 214 | 2 | 4 |
| CCA Threshold 114 | 3 | 4 |
| Other | | |

In an implementation, broadcast of the HD action frame 210 is performed at a relatively low rate to increase a likelihood of reliable communication. A variety of other frame formats are also contemplated which may comply with and/or add to a variety of other wireless standards, the previous discussion being merely an example of one such implementation.

Exemplary Procedures

The following discussion describes techniques to provide distributed coordination of a clear channel assessment (CCA) threshold that may be implemented utilizing the previously described systems and devices. The procedures are shown as a set of blocks that specify operations performed by one or more devices and are not necessarily limited to the orders shown for performing the operations by the respective blocks.

Figure 3:
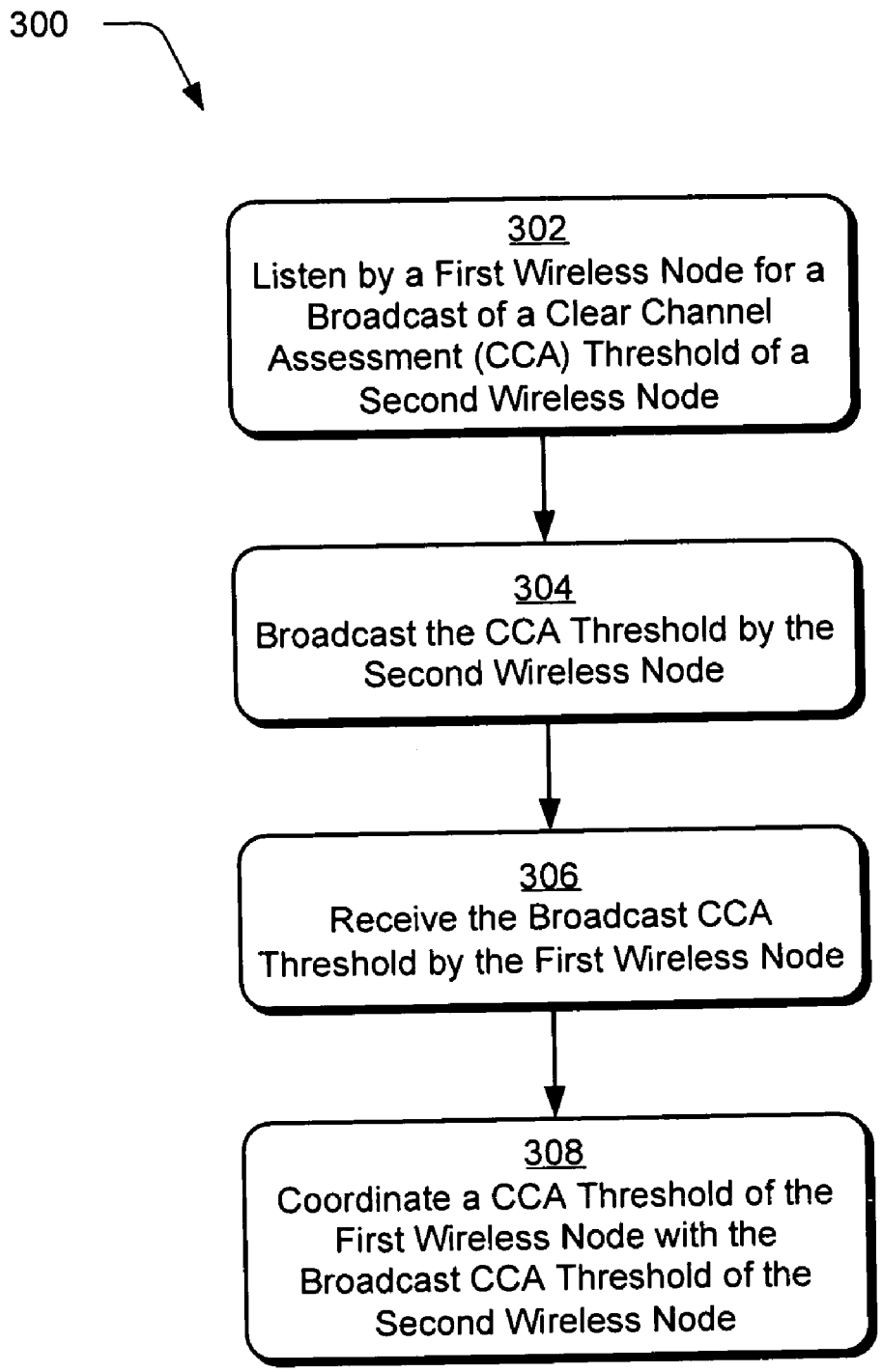
FIG. 3 is a flow diagram depicting a procedure in an exemplary implementation in which a wireless node coordinates a local clear channel assessment threshold based on a clear channel assessment threshold of another wireless node received via a broadcast.

FIG. 3 depicts a procedure 300 in an exemplary implementation in which a wireless node coordinates a local CCA threshold based on a CCA threshold of another wireless node received via a broadcast. During discussion of this exemplary procedure, reference will also be made to the exemplary environment 100 of FIG. 1, however, it should be apparent that implementation of the procedure 300 is not limited to that environment 100.

A first wireless node listens for a broadcast of a clear channel assessment (CCA) threshold of a second wireless node (block 302). For example, wireless node 102(n), through execution of the communication module 110, may listen for broadcasts using the wireless receiver 108.

The CCA threshold is broadcast by the second wireless node (block 304). The broadcast, for instance, may be performed by wireless node 102(1) using the HD action frame 210 that includes a CCA threshold.

The broadcast CCA threshold is received by the first wireless node (block 306). Continuing with the previous example, wireless node 102(n) may identify the broadcast using the communication module 110 and receive the broadcast CCA threshold via the wireless receiver 108.

A CCA threshold of the first wireless node is coordinated with the broadcast CCA threshold of the second wireless node (block 308). The wireless node 102(n), for instance, may employ the distributed coordination module 112 to coordinate the CCA threshold 114 of the wireless node 102(n) with the broadcast CCA threshold to optimize spatial reuse of wireless communication channels. A variety of coordination techniques may be employed, further discussion of which may be found in relation to the following figures.

Figure 4:
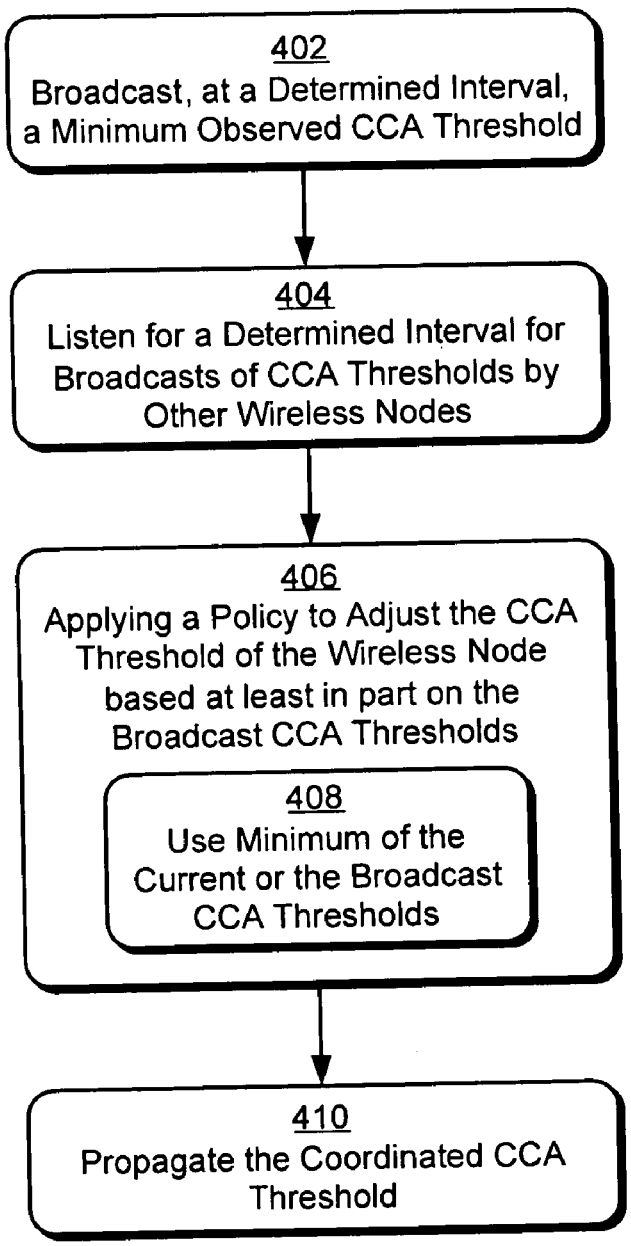
FIG. 4 is a flow diagram depicting a procedure in an exemplary implementation in which a clear channel assessment threshold is coordinated through use of a policy and the coordinated clear channel assessment threshold is propagated to other wireless nodes.

FIG. 4 depicts a procedure 400 in an exemplary implementation in which CCA thresholds are coordinated through use of a policy and the coordinated threshold is propagated to other wireless nodes. At a determined interval, a minimum CCA observed is broadcast (block 402). For example, every "T1" seconds, a wireless station (e.g., wireless node 102(1) illustrated as a laptop computer) may broadcast an HD action frame. The HD action frame includes a minimum CCA threshold that the wireless stations has observed during the interval, e.g., the CCA threshold of the wireless station (e.g., the wireless node 102(1)) or a CCA threshold received by the wireless station from another wireless station, such as the wireless node 102(N) depicted as a desktop PC.

The wireless node also listens for a determined interval for broadcasts of CCA thresholds by other wireless nodes (block 404). Continuing with the previous example, the wireless station (e.g., the wireless node 102(1)) may listen for "T2" seconds, where T2 is greater than T1, for broadcasts from other wireless nodes, e.g., wireless node 102(N) illustrated as a desktop PC wireless station.

A policy is then applied to adjust the CCA threshold of the wireless node based at least in part on the Broadcast CCA thresholds (block 406). For example, the policy may specify that a minimum of the current or the broadcast CCA thresholds (block 408) is to be used by the wireless node. For instance, the minimum CCA threshold overheard during the "listening period" "T2" may be denoted as "C1" and the current threshold of the wireless node may be denoted as "C2". The policy in this instance specified that the CCA threshold for the next interval is to be set according to the following expression:

$$\min(C1, C2)$$

Therefore, the CCA threshold of the wireless node in this instance is set to the minimum broadcast CCA threshold, e.g., when the broadcast CCA threshold is lower than the current CCA threshold. Likewise, the current CCA threshold of the wireless node is kept when it is lower than the minimum broadcast CCA threshold. A variety of other instances are also contemplated. For example, the policy may specify that the CCA threshold as computed in the above instance is to be used as an input for further processing by CCA adaptations algorithms employed by the wireless node, e.g., "stand-alone" processing as previously described.

The coordinated CCA threshold is propagated (block 410) to other wireless nodes. For example, an "active listening" propagation technique may be employed in which the wireless node (e.g., a wireless station) lowers its CCA threshold to enlarge it listening range to determine whether to transmit. For instance, a wireless node may operate at a lowest CCA threshold (e.g., −80 dBm), i.e., its highest sensitivity, for "X" period of time (e.g., twenty percent of the listening interval "T2"). Additionally, the active listening period may be randomly located in the listening interval "T2" to avoid synchronization between wireless nodes.

In another example, a "relaying" propagation technique is employed. For example, the relaying technique may be used to propagate the CCA threshold by relaying between wireless nodes when there is sufficient "density" of wireless nodes in the wireless network. A variety of other examples are also contemplated. Therefore, a principle for distributed CCA threshold coordination has been described, in which, a CCA threshold may be driven by a station with a minimum CCA threshold in the wireless network.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
   a wireless transmitter;
   a communication module to broadcast a clear channel assessment (CCA) threshold using the wireless transmitter, wherein the CCA threshold specifies a minimum amount of incoming energy for a wireless communication channel to be considered as not available for communication; and
   a coordination module to coordinate the clear channel assessment (CCA) threshold to be broadcast with another CCA threshold received in a broadcast using a wireless receiver, wherein the communication module employs an active listening propagation technique at predefined random time intervals within a predefined listening time interval, wherein the active listening propagation technique comprises lowering the CCA threshold to enlarge a listening range.

2. An apparatus as described in claim 1, wherein the clear channel assessment (CCA) threshold is to be broadcast using an action frame that is to further indicate transmission power or an energy detection threshold.

3. An apparatus as described in claim 1, wherein the broadcast is to further specify another clear channel assessment threshold received in a broadcast of another action frame.

4. An apparatus as described in claim 1, wherein the coordinating includes setting the clear channel assessment (CCA) threshold to be broadcast as equal to the other CCA threshold when the other CCA threshold is lower than the CCA threshold to be broadcast.

5. An apparatus as described in claim 1, wherein the coordinating includes:
   keeping the clear channel assessment (CCA) threshold to be broadcast set as is when it is lower than the other CCA threshold,
   broadcasting the kept CCA threshold.

6. A method comprising:
   monitoring to detect, by a first wireless node, a broadcast of a clear channel assessment (CCA) threshold of a second wireless node, wherein:
      the CCA threshold specifies a minimum amount of incoming energy for a wireless communication channel to be considered as not available for communication; and
      monitoring to detect comprises monitoring for a predetermined amount of time and actively monitoring during at least a randomly determined portion of the predetermined amount of time, wherein actively monitoring is performed at a relatively higher sensitivity than monitoring performed during another portion of the predetermined amount of time; and
   coordinating a CCA threshold of the first wireless node with the broadcast CCA threshold of the second wireless node.

7. A method as described in claim 6, wherein the coordinating includes setting the clear channel assessment (CCA) threshold of the first wireless node to the broadcast CCA threshold if the broadcast CCA threshold is lower than the CCA threshold of the first wireless node.

8. A method as described in claim 6, wherein the coordinating includes applying a policy to adjust the clear channel assessment (CCA) threshold of the first wireless node using the broadcast CCA threshold and further comprising propagating the broadcast CCA threshold and the adjusted CCA threshold of the first wireless node to a third wireless node.

9. A method as described in claim 6, wherein the coordinating includes keeping the clear channel assessment (CCA) threshold of the first wireless node set as is when it is lower than the broadcast CCA threshold.

10. A method as described in claim 9, further comprising broadcasting the kept clear channel assessment (CCA) threshold of the first wireless node to the second wireless node.

11. A method as described in claim 6, wherein the broadcast is performed using an action frame to specify the clear channel assessment threshold, transmission power or an energy detection threshold of the second wireless node.

12. A method as described in claim 11, wherein the action frame is to specify another clear channel assessment threshold received in a broadcast from a third wireless node.

13. A method as described in claim 6, further comprising determining whether the wireless communication channel is occupied by detecting the amount of incoming energy on the wireless communication channel and comparing the detected amount of incoming energy to the clear channel assessment (CCA) threshold.

14. A system comprising:
   a wireless receiver;
   a display device to display data related to the wireless receiver; a module to coordinate a clear channel assessment (CCA) threshold with another CCA threshold specified in a broadcast of an action frame received via the wireless receiver, wherein the CCA thresholds specify a minimum amount of incoming energy for a wireless communication channel to be considered as not available for communication; and
   a coordination module to coordinate the clear channel assessment (CCA) threshold to be broadcast with another CCA threshold received in a broadcast using a wireless receiver, wherein the communication module employs an active listening propagation techniques at predefined random time intervals within a predefined listening time interval, wherein the active listening propagation technique comprises lowering the CCA threshold to enlarge a listening range.

15. A system as described in claim 14, wherein the action frame is to further specify transmission power and an energy detection threshold.

16. A system as described in claim 14, wherein the module is to perform the coordinating based at least in part on a plurality of broadcast CCA thresholds received from a plurality of wireless nodes.

17. A system as described in claim 14, wherein the action frame is to specify another clear channel assessment threshold received in a broadcast of another action frame.

18. A system as described in claim 14, further comprising a housing to contain the wireless receiver, the display device and the module as a wireless router.

19. One or more computer readable media encoded with computer executable instructions that, when executed:
   monitor to detect a broadcast of a clear channel assessment (CCA) threshold that specifies a minimum amount of incoming energy for a wireless communication channel to be considered as not available for communication, wherein the monitoring is to be performed over a predetermined amount of time, during at least a randomly determined portion of the predetermined amount of time monitoring is performed at a relatively higher sensitivity than monitoring performed during another portion of the predetermined amount of time; and coordinate a CCA threshold with the broadcast CCA threshold.

20. One or more computer readable media as described in claim 19, wherein the coordination is to set the clear channel assessment (CCA) threshold to the broadcast CCA threshold if the broadcast CCA threshold is lower than the CCA threshold.

* * * * *